United States Patent
Basturk (10) Patent No.: US 6,515,942 B2
(45) Date of Patent: *Feb. 4, 2003

(54) DISPLAY ASSEMBLY INCLUDING TWO SUPERPOSED DISPLAY DEVICES

(75) Inventor: Naci Basturk, Enges (CH)

(73) Assignee: Asulab S.A. (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,543

(22) Filed: Feb. 22, 1999

(65) Prior Publication Data

US 2002/0036955 A1 Mar. 28, 2002

(30) Foreign Application Priority Data

Feb. 27, 1998 (CH) ............................................. 0466/98

(51) Int. Cl.[7] .............................................. G04C 17/00
(52) U.S. Cl. .......................... 368/223; 368/84; 368/242; 349/56
(58) Field of Search .......................... 368/84, 242, 223; 349/58, 96, 56

(56) References Cited

U.S. PATENT DOCUMENTS

| | | | | |
|---|---|---|---|---|
| 4,017,156 A | * | 4/1977 | Moriyama et al. | 349/78 |
| 4,247,930 A | * | 1/1981 | Martin | 368/84 |
| 4,413,915 A | * | 11/1983 | Besson | 368/71 |
| 4,435,047 A | | 3/1984 | Fergason | 350/334 |
| 4,970,815 A | * | 11/1990 | Sunderland | 368/79 |
| 5,437,811 A | | 8/1995 | Doane et al. | 252/299.01 |
| 6,141,067 A | * | 10/2000 | Ikka | 349/65 |
| 6,147,934 A | * | 11/2000 | Arikawa et al. | 368/84 |
| 6,147,937 A | * | 11/2000 | Arikawa et al. | 368/84 |

FOREIGN PATENT DOCUMENTS

| | | |
|---|---|---|
| EP | 0 516 076 A2 | 12/1992 |
| EP | 0 600 349 A1 | 6/1994 |
| EP | 0 643 318 A1 | 3/1995 |
| EP | 0 724 180 A2 | 7/1996 |
| EP | 0724180 * | 7/1996 |
| EP | 0 814 366 | 12/1997 |
| EP | 0 825 477 | 2/1998 |
| EP | 0 927 917 | 7/1999 |
| FR | 2 462 283 | 2/1981 |

* cited by examiner

Primary Examiner—Vit Miska
Assistant Examiner—Jeanne-Marguerite Goodwin
(74) Attorney, Agent, or Firm—Griffin & Szipl, P.C.

(57) ABSTRACT

A display assembly includes two superposed, respectively upper (24) and lower (26) display devices, characterized in that the upper display device (24) includes a display cell (28) arranged above an optical valve (30), said double structure being arranged so as to be transparent in a first state to make the lower display device visible (26), and so as to display item of data in a second state, control circuits supplying a control voltage to the cell (28) to cause it to switch from the first state to the second state and vice versa, characterized in that the cell (28) is a display cell of the type including a diffusing or reflective liquid crystal in the second state.

23 Claims, 5 Drawing Sheets

DISPLAY ASSEMBLY INCLUDING TWO SUPERPOSED DISPLAY DEVICES

FIELD OF INVENTION

The present invention concerns a display assembly including at least two superposed display devices and more particularly a timepiece including a display assembly of this type in which an analogue display device is combined with a digital display device.

BACKGROUND OF THE INVENTION

An electronic watch including a case in which both an analogue display device and a digital display device are arranged is already known from French Patent FR 2 462 283. The analogue display device includes an hour hand and a minute hand which move above the dial in a conventional manner, while the digital display device includes a transparent liquid crystal cell arranged above the analogue display device which it completely covers. In this Patent, the digital display device allows the display of alphanumeric characters, for example the day of the week and the month in a dark colour on a light background. The liquid crystal cell forms the watch crystal. It is a twisted nematic liquid crystal including two polarisers arranged on either side of the cell, the dial which is situated under the cell being used as a reflector. With such a structure, the reflector and thus the watch dial, must reflect the incident light without modifying its polarisation in order to produce a brilliant high-contrast display. This display device thus limits the type of dial which it is possible to use to form the lower display device, in particular when the lower display device is a digital display device. In such case, only dials having non diffusing reflective properties, in other words metal reflectors, can be used.

Moreover, this type of cell generally displays data in a dark colour on a light background, which excludes the use of dark dials as reflectors. Further, the light background actually appears rather greyish because of the absorption of a non negligible quantity of light by the polarisers, which gives the display device unsatisfactory legibility and brightness.

Such a limit on the choice of dials represents a significant drawback for watch manufacturers who wish to be able to put watches including all types of dials on the market in order to adapt to changes in fashion.

Further, since the reflection of light occurs on the dial, and thus at a certain distance from the cell, typically 2 to 3 mm, the images and segments switched from the cell appear in projection on the dial, which leads to optical splitting of the displayed data. This is detrimental not only to the aesthetic appearance of the watch but also, of course, to the legibility of the displayed data.

SUMMARY OF THE INVENTION

An object of the present invention is to overcome the drawbacks of the aforementioned prior art by providing a display assembly including two superposed, respectively lower and upper, display devices, in which the brilliance of the data displayed by the upper display device and thus the legibility thereof, is not dependent or hardly dependent upon the nature (diffusing/reflective) of the dial of the lower display and its colour (light or dark).

Another object of the present invention is to provide a display assembly in which the upper display device is a liquid crystal device with an improved display contrast.

Another object of the present invention is to provide a timepiece fitted with such a display assembly having an improved aesthetic appearance.

The invention therefore concerns a display assembly including two superposed, respectively upper and lower display devices, the upper display device including a display cell arranged to be transparent in a first state to make the lower display device visible, and to display an item of data in a second state, control means supplying a control voltage to the cell to cause it to switch from the first state to the second state and vice versa, characterised in that said cell is a liquid crystal display cell of the diffusing or reflective type in the second state.

As a result of these features, the reflection of the incident light penetrating the cell no longer occurs on a dial placed behind the cell, as was the case in the prior art, but directly on the liquid crystal cell when the latter is switched into the second state. On the one hand this allows any projection interference of the switched zones on the dial to be removed, and thus the double display of such zones to the user to be prevented and, on the other hand, leaves watch manufacturers complete freedom in the choice of colours and the nature of the dial or lower display device. Such a display structure further increases the brilliance of the data displayed and, consequently, the legibility thereof, in particular when the lower display device is dark or includes a dark dial.

According to an advantageous feature of the invention, the liquid crystal cell is selected from the group formed by reverse PDLC cells, nematic gel or dynamic scattering cells, polymer stabilised chlolesteric texture cells (PSCT), electrolytic cells, and from twisted nematic cells provided with a polariser placed in front of the cell, having one quarter-wave plate and a cholesteric film placed successively behind the cell, and from twisted nematic cells provided with a first polariser placed in front of the cell and a reflective polariser which may or may not be associated with a second polariser placed behind the cell.

According to a first embodiment, the display assembly includes a cell of the twisted nematic type fitted with a polariser placed in front of the cell, and a quarter-wave plate associated with a cholesteric film placed successively behind the cell, the upper display device or the lower display device further including a second quarter-wave plate placed behind the cholesteric film and the lower display device including a metal reflector placed behind said second quarter-wave plate.

The passage of light through the second quarter-wave plate allows the circular polarised light originating from the cholesteric film to be transformed into linear polarised light for which the metal reflector is more efficient. This structure allows the reflected light to be homogenised by the display assembly and the colour thereof to be made less dependent upon the wavelength of the light.

According to a second embodiment, the display assembly includes a cell of the twisted nematic type provided with a polariser placed in front of the cell, and a quarter-wave plate associated with a cholesteric film having a first helical direction, placed in succession behind the cell, the lower display device including a cholesteric mirror having an opposite helical direction to that of said cholesteric film.

As a result of this structure, all the light passing through the cholesteric film, and representing half of the incident light, is reflected by the cholesteric mirror, which allows the brilliance of the display assembly to be improved. In the case of a wristwatch or suchlike, the cholesteric mirror can advantageously form the dial of the watch. Another advantage of this structure lies in the fact that one can choose cholesteric mirrors of different colours, which allows coloured display devices to be achieved.

According to a third embodiment, the optical valve includes a cell of the twisted nematic type provided with a polariser placed in front of the cell, and a quarter-wave plate associated with a cholesteric film placed in succession behind the cell, the lower display device further including a half-wave plate ($\lambda/2$) and a second cholesteric film identical to the first.

As a result of this structure, one can use two same optical elements associated with the display cell, which represents an advantage from the practical point of view.

According to another embodiment of the invention, the display cell is in a transparent state in the absence of voltage applied thereto by the control means.

The data displayed by the lower display device is permanently visible without the upper display device consuming any energy. This is particularly advantageous within the scope of the application of this display device to a portable object such as a wristwatch.

BRIEF DESCRIPTION OF THE DRAWINGS

Other features and advantages of the present invention will appear in the following description of a preferred embodiment, given by way of nonlimiting example with reference to the annexed drawings, in which.

DESCRIPTION OF THE PREFERRED EMBODIMENTS

The description of the invention will be made within the scope of an application to a timepiece such as a wristwatch. It goes without saying however, that the invention is not limited to this application and that it could advantageously be used within the scope of any other application requiring the display of data such as advertising billboards, measuring instruments, etc.

With reference to FIGS. 1 to 4, one sees a timepiece of the wristwatch type designated by the general reference 1. This watch 1 includes, in a conventional manner, a case 2 fitted with a back cover 4 in which are arranged an electronic clockwork movement 6 and a battery 8 which rests on back cover 4 via a contact spring 10. Movement 6 includes time-keeping circuits associated, via a control circuit, with a driving device (not shown) for a second hand 12, a minute hand 14 and an hour hand 16. These hands 12, 14 and 16 move above a dial 18 which carries hour symbols 20 which are visible in FIG. 2. Case 2 is also closed in a conventional manner by a crystal 22 covering the whole of dial 18.

According to the invention, watch 1 further includes a display assembly including two superposed, respectively upper and lower display devices 24 and 26. In the example shown, lower display device 26 includes display means of time related information, in particular analogue time display means formed by hands 12, 14, 16 and dial 18.

It goes without saying that this lower display device 26 could be formed by any digital display device, for example of the liquid crystal type. This display device 26 could also include a combination of analogue and digital display means such as the combination described in European Patent EP-B-0 078 237 in the name of the Applicant or even a decorative element, for example a picture, figure, etc.

Figure 1:
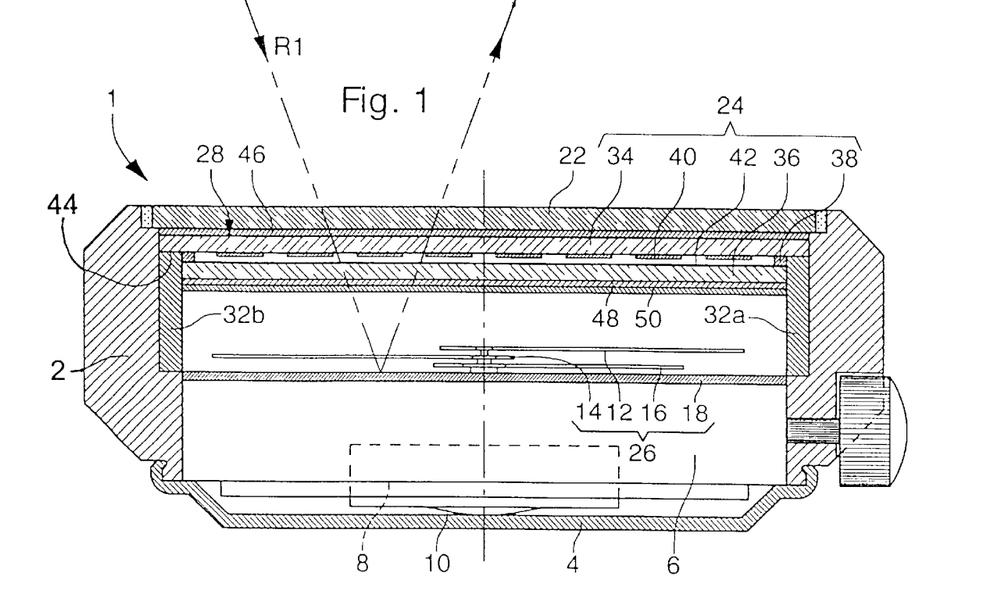
FIG. 1 is a cross-section of a wristwatch fitted with a display device according to the present invention, the assembly being switched into a first state allowing the lower display device to appear.
Figure 2:
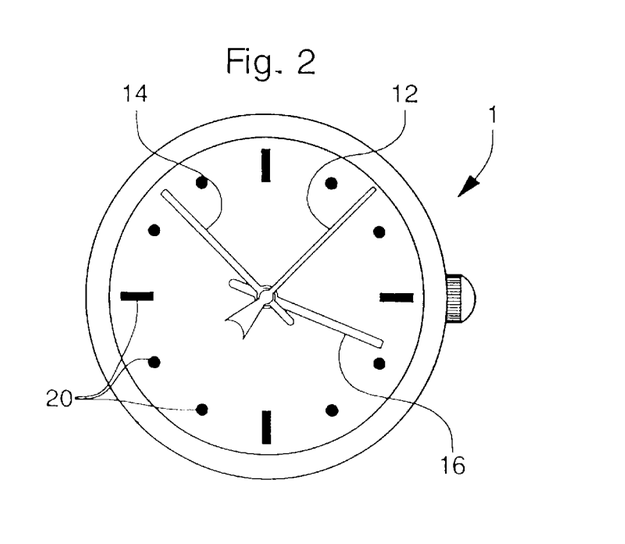
FIG. 2 is a top view of the wristwatch shown in FIG. 1, the display assembly being in the same switching state as in FIG. 1.
Figure 3:
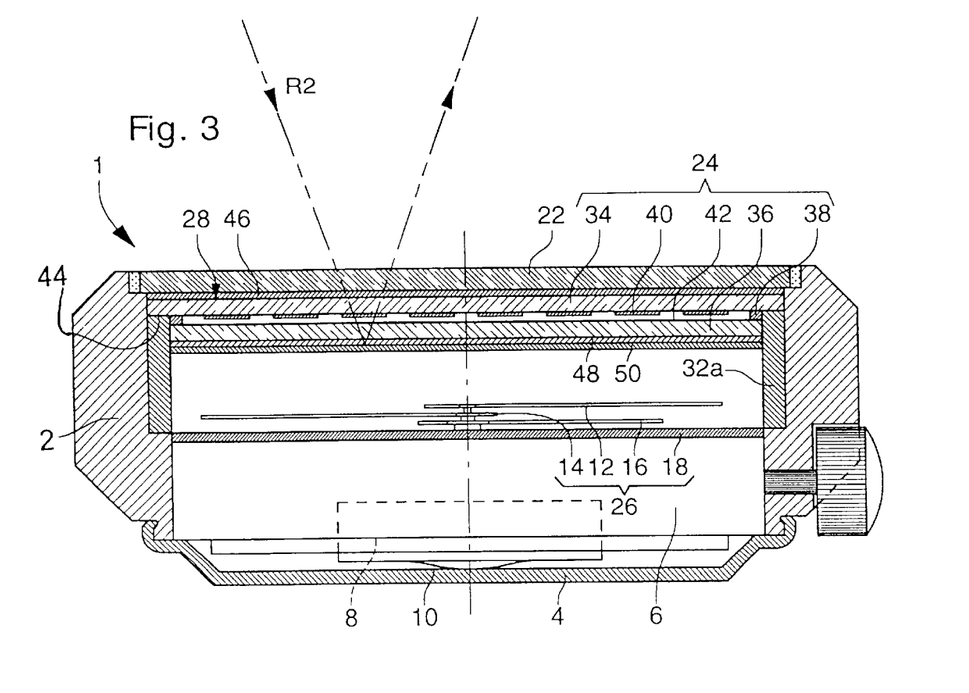
FIGS. 3 and 4 are similar views respectively to those of FIGS. 1 and 2, the display assembly being switched into a second state in which the data is displayed in reflective opaque on a transparent background.
Figure 4:
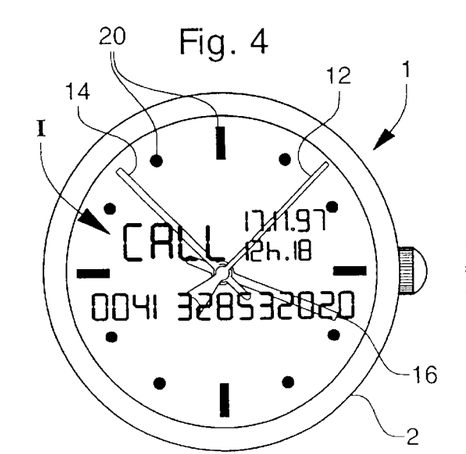

According to the invention, upper display device 24 includes a display cell 28 and extends between lower display device 26 and crystal 22. In the example shown, this upper display device 24 covers the whole of the surface of dial 18. It goes without saying that, according to an alternative embodiment, upper display device 24 can form crystal 22 of watch 1. Display device 24 is arranged so that display cell 28 is transparent in a first switching state so as to make the data displayed by lower display device 26, i.e. hands 12, 14 and 16 and dial 18 in the example shown, visible. Such a configuration of the display assembly according to the invention is shown in FIGS. 1 and 2. On the other hand, upper display device 24 is arranged so that display cell 28 displays an item of data, for example of the alphanumeric type in a second switching state. Such a configuration of the display device according to the invention is shown in FIGS. 3 and 4.

The switching of display cell 28 from the first state to the second state and conversely is achieved by control means (not shown) integrated in movement 6, these control means being connected to cell 28 by means of conventional connectors 32a, 32b, to supply them with a control voltage. In the example shown, these connectors 32a and 32b also form a flange arranged between the upper edge of dial 18 and the lower edge of cell 28.

According to the invention, cell 28 is a diffusing or reflective liquid crystal cell in the second switching state.

According to a preferred embodiment of the invention, cell 28 is a liquid crystal display cell of the twisted nematic (TN) type. This cell 28 includes a transparent front substrate 34, a transparent back substrate 36, a sealing frame 38 forming spacing and closing means and delimiting with substrates 34 and 36 a cavity in which is situated a layer of liquid crystals. The facing faces of substrates 34 and 36 include transparent electrodes 40, 42, made for example of indium/tin oxide. In the example illustrated, front substrate 34 carries electrodes configured in digits each formed of segments allowing alphanumeric characters to be displayed, while back substrate 36 carries an electrode extending over its entire surface. Electrodes 40 and 42 are connected to connector 32a via contact areas 44 situated outside the cavity. Cell 28 further includes, on the side of crystal 22, a linear polariser 46 and, on the side of dial 18, a quarter-wave plate 48 associated with a cholesteric film 50. Such a cell is similar to the display device described in the publication by T. J. Scheffer entitled <<Twisted Nematic Display with Cholesteric Reflector>> published in J. Phys. Appl. Phy., Vol. 8, 1975 which is cited here by way of reference.

Polariser 46 is preferably of the high efficiency polarisation and transmission type such as, for example, the polariser marketed by the Sanritsu company, Japan under the reference $LLC_2 5618SF$.

It will also be noted that, according to an alternative, the twisted nematic (TN) liquid crystal cell described in Scheffer's publication can be replaced by a colour display device such as that disclosed in the European Patent EP-A-0 600 349 which is also cited here by way of reference. According to another alternative, a cholesteric film 50 which reflects a wavelength or portion of the visible spectrum corresponding to a predetermined colour may be selected. In this way, one can choose to display the data in a complementary colour to that of the dial, and thus to improve the contrast and the aesthetic appearance of the display assembly.

Within the scope of the invention, switchable device 28 is advantageously transparent in the non switched state and reflective in the switched state.

When a voltage is applied or removed between electrode 42 and certain of electrodes 40, the liquid crystals situated between these electrodes 42 and 40 are switched alternately from a reflective or diffusing state to a transparent state.

It is to be noted that display cell 28 is a liquid crystal cell of the 90° twisted nematic type, polariser 46 is of the conventional linear type, quarter-wave plate 48 polarises the light in a circle to the right, and cholesteric film 50 is a left twisted nematic film. Thus, cell 28 is totally transparent (FIGS. 1 and 2) in the first switching state, i.e. when no voltage is applied across the terminals of electrodes 40, 42 (non switched state). This state is symbolised by the ray of light R1 in FIG. 1 where one sees that it passes through cell 28 and is reflected by dial 18. Cell 28 is reflective or diffusing in its switched regions, i.e. when a voltage is applied across the terminals of electrodes 40, 42 (switched state). This second state is represented by the ray of light R2 in FIG. 3 where one sees that it is reflected by cell 28. One can thus display opaque data on a reflective background, the opaqueness being determined by the colour reflected by cholesteric film 50, and the background being determined by the colour of dial 18.

Figure 5:
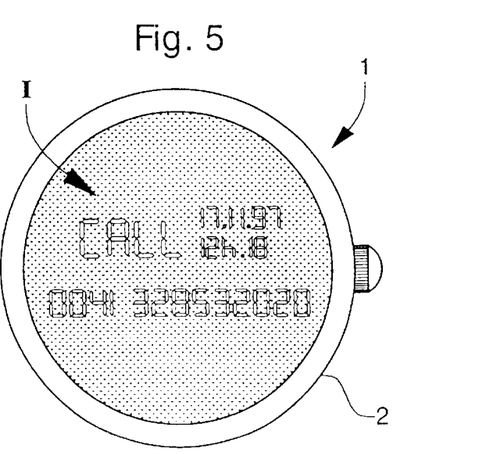
FIG. 5 is a top view of a wristwatch similar to that of FIG. 4 including a display assembly according to the invention in which the data is displayed transparently on a reflective opaque background.

In the event that one wishes to have a transparent display on an opaque background (FIG. 5), polariser 46 is rotated through 90° with respect to its initial orientation. It will be noted that this same effect can also be obtained by rotating quarter-wave plate 48 through 90° with respect to its initial orientation. In this case, cell 28 is opaque and reflective when no control voltage is applied, and becomes transparent if a control voltage is applied between electrodes 40, 42.

In the following description, the elements which are identical to those described in conjunction with FIGS. 1 to 5 will be designated by the same numerical references.

Figure 6:
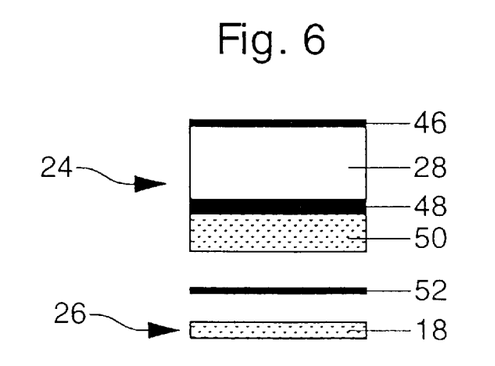
FIGS. 6 to 9 show schematic views of different embodiments of the display assembly according to the invention.

With reference now to FIG. 6, a first alternative embodiment of the display device according to the invention is shown. According to this alternative, upper display device 24 further includes a second quarter-wave plate 52 placed immediately behind cholesteric film 50, and lower display device 26 includes a dial 18 forming a metal reflector. By way of example, the visible face of dial 18 can include a reflective metal layer if dial 18 is not made of metal, or this face can be mirror-polished if dial 18 is metal. It will be noted that it is also possible to integrate second quarter-wave plate 52 directly in dial 18.

Figure 7:
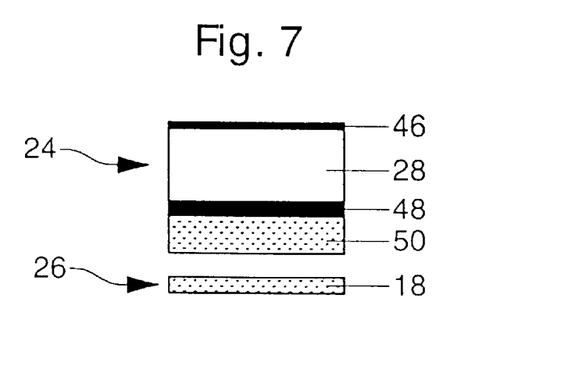

With reference now to FIG. 7, a second alternative embodiment of the display assembly according to the invention is shown. According to this embodiment, lower display device 26 includes a dial 18 forming a cholesteric mirror having an opposite helical direction to that of said cholesteric film 50 of upper display device 24.

Figure 8:
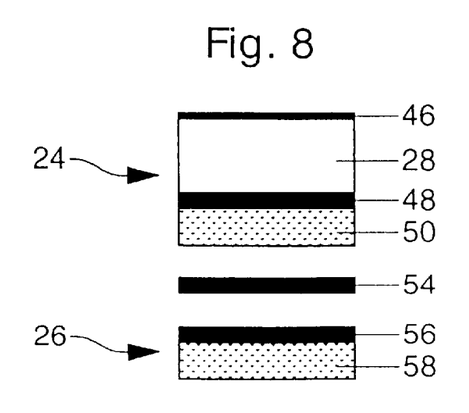

With reference now to FIG. 8, a third alternative embodiment of the display assembly according to the invention is shown. According to this alternative, lower display device 26 further includes a second and a third quarter-wave plate 54, 56 and a second cholesteric film 58 replacing dial 18.

Figure 9:
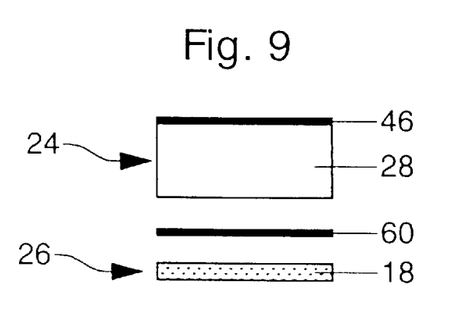

According to another alternative shown in FIG. 9, cell 28 can include on the side of crystal 22, a linear polariser 46 and, on the side of dial 18, a reflective polariser 60, which may or may not be associated with a linear polariser placed in front of it in the place of quarter-wave plate 48 and cholesteric polariser film 50.

In an advantageous manner, the reflective polariser can be of the $\mu$-prism type such as, for example, the product marketed under the name DBEF (Dual Brightness Enhancement Films) by the 3M company. Other films used for improving the brightness of the system such as the BEF (Brightness Enhancement Films) produced by the 3M company may or may not be associated with the aforecited DBEF film. If required, the reflective polariser described hereinbefore could be replaced by a transflective polariser such as for example the product marketed under the name TDF by the 3M company. Quarter-wave plate 48 and cholesteric film 50 could also be integrated in a single element, for example such as the product TRANSMAX® marketed by Merck.

It is obvious that any other polariser reflecting one of the components of the polarised light linearly and transmitting the other component substantially perpendicularly to the first, can also be used behind cell 28 of the TN type provided with a linear polariser in front of the cell.

Figure 10A:
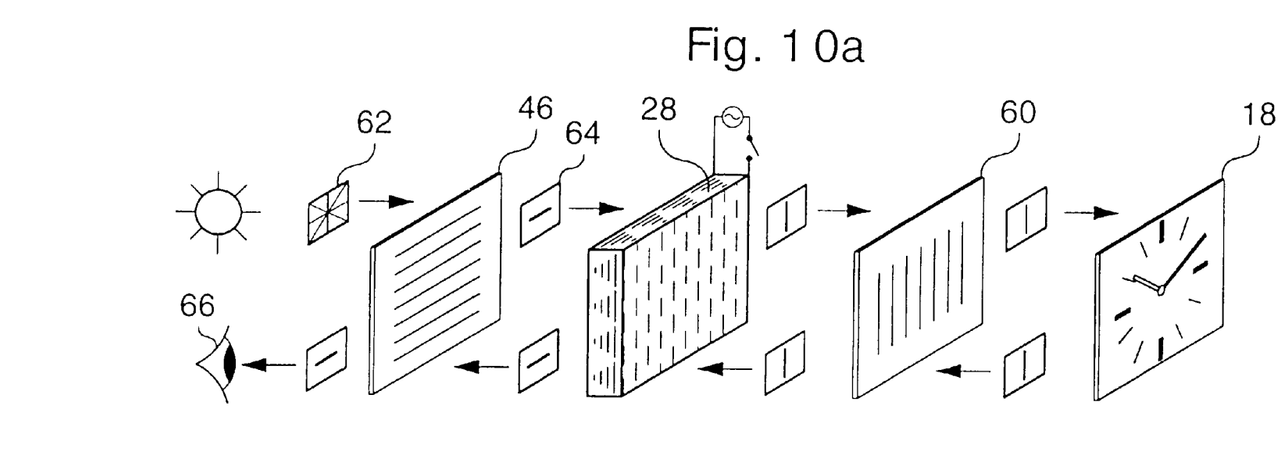
FIGS. 10a, 10b and 11b are schematic views of liquid crystal display cells of the twisted nematic type.
Figure 10B:
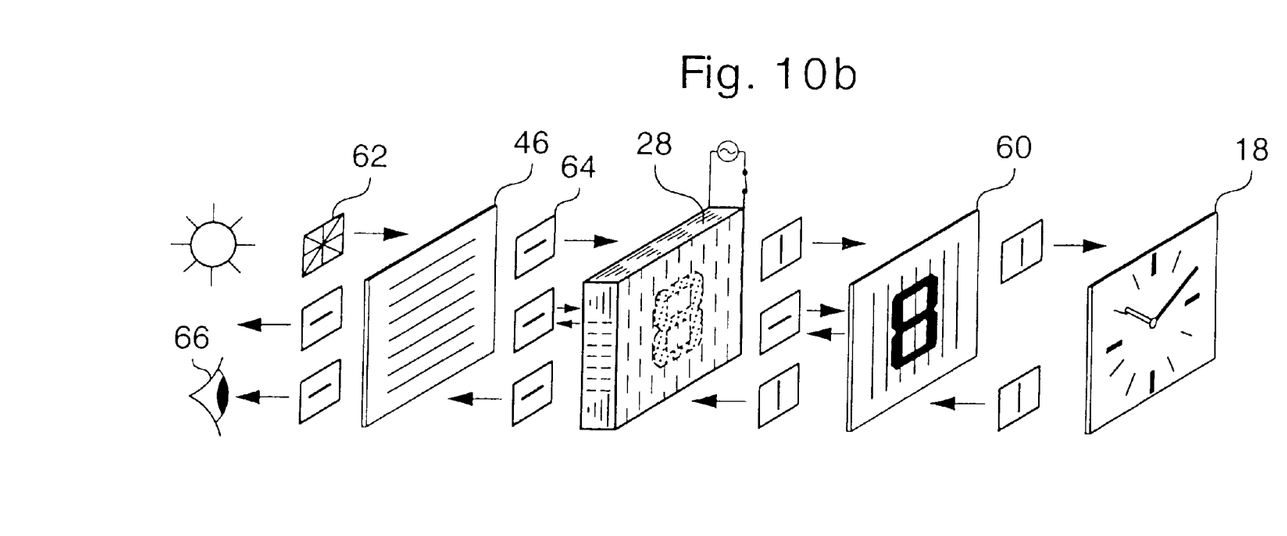

In a first state shown in FIG. 10a, linear polariser 46 and reflective polariser 60 are oriented so that their axes of polarisation are crossed. With a display cell 28 which is a positive dielectric anisotropy twisted nematic liquid crystal cell placed between the two, the non switched state of cell 28 is totally transparent, so that dial 18 is visible. As is seen in FIG. 10a, the natural non polarised light, designated by the numerical reference 66, is polarised vertically by linear polariser 46. The direction of polarisation of the light, designated by the reference 64 is then rotated by 90° when it passes through display cell 28, then it is transmitted without modification by reflective polariser 60 to dial 18. The light follows the same path during its return travel, so that dial 18 is visible to an observer 66. Conversely, when cell 28 is in the switched state (FIG. 10b), dial 18 is at least partially masked. In this second switched state, cell 28 is reflective or diffusing in its switched regions, i.e. in the zones in which electrodes 40 and 42 are switched. As is seen in FIG. 10b, the vertically polarised light which passes through cell 28 in the switched zones thereof is not modified, so that it is reflected by reflective polariser 60. Likewise, the light which passes through cell 28 outside its switched zones is transmitted to dial 18. The data is thus displayed in opaque on a reflective background, the opaqueness being determined by the colour reflected by reflective polariser 60, and the background being determined by the colour of dial 18. FIG. 10b also shows that the addressing of cell 28 is normal, i.e. the switched segments thereof are those which it is sought to display. According to an alternative which is not shown in the drawings, the addressing of display cell 28 can be reversed, i.e. all the segments of said cell 28 are switched, to the exclusion of those which it is sought to display. In this case, the data is displayed transparently on an opaque background, the transparency being, here also, determined by the colour of dial 18. It will be noted that by rotating linear polariser 46 by 90°, the reverse situation can be obtained, i.e. the non switched state is opaque and the switched state is transparent.

Figure 11A:
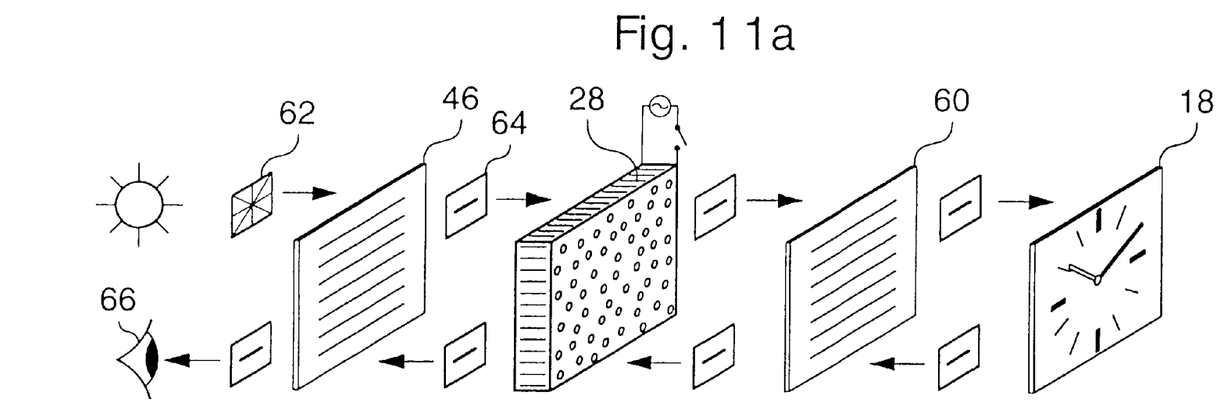
Figure 11B:
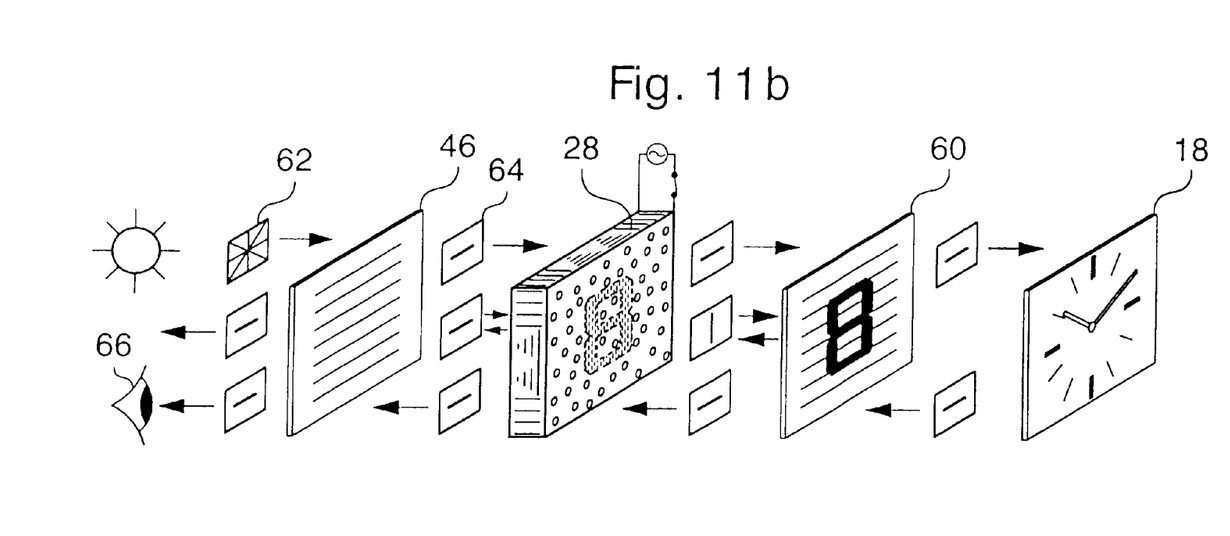

In a second state shown in FIG. 11a, linear polariser 46 and reflective polariser 60 are oriented so that their axes of polarisation are parallel. Between the two polarisers 46, 60 is placed a display cell 28 which is a negative anisotropy twisted nematic liquid crystal cell. The alignment of the liquid crystal molecules is thus homeotropic in the non switched state of said cell 28, so that the latter has no effect on the direction of polarisation of the light in this state. By applying similar reasoning to that discussed in relation to FIGS. 10a and 10b as regards the direction of polarisation of the light, it will be understood that the non switched state of cell 28 is totally transparent (FIG. 11a), so that dial 18 is visible. Conversely, in the second switched state (FIG. 11b), cell 28 is reflective or diffusing in the zones in which electrodes 40 and 42 are switched. Dial 18 is thus partially masked, and the data appears to observer 66 opaque on a transparent background, the opaqueness being determined by the colour reflected by reflective polariser 60, and the background being determined by the colour of dial 18. FIG. 11b shows that the addressing of cell 28 is normal, i.e. the switched segments are those which it is sought to display. According to an alternative which is not shown in the drawings, the addressing of cell 28 can also be reversed. The data is then displayed transparently on an opaque background, the transparency being determined by the colour reflected by reflective polariser 60.

It goes without saying that cell 28 can be of another type provided that it is transparent in a first switching state, and that it is reflective and diffusing in a second switching state.

Other types of cell 28 could also be chosen, for example cells of the reverse PDLC, nematic gel and cholesteric structure, dynamic scattering, polymer stabilised cholesteric structure (PSCT) and electrolytic types.

The structure and operation of these types of cells are well known to those skilled in the art and will not be described further.

For a complete description of the structure and operation of nematic gel and cholesteric texture type cell, reference will be made for example to U.S. Pat. No. 5,188,760 and European Patent EP-A-0 451 905 which are cited here by way of reference.

For a complete description of the structure and operation of a polymer dispersed liquid crystal cell, reference will be made for example to U.S. Pat. No. 4,435,047 which is cited here by way of reference.

It will be noted in this regard that a reverse PDLC cell will be chosen if one wishes to obtain a cell which is transparent in the non switched state, and opaque and reflective in the switched state.

For a complete description of the structure and operation of a dynamic scattering type cell, reference will be made for example to volume 1 of the work entitled <<Liquid Crystals Applications and Uses>> edited by B. Bahadur at pages 196–227 which is cited here by way of reference.

All the types of cell 28 described hereinbefore can of course be passively addressed by a matrix of electrodes or even actively addressed by non linear elements such as thin layers of transistors (TFT; MIM) or diodes.

For a complete description of the structure and operation of a cell of the electrolytic type, reference will be made for example to the publication by J. Duchene et al. entitled <<Electrolytic Display>>, published in SID 1978 pages 34 to 37 which is cited here by way of reference. It will be noted that such a cell is transparent in the non switched state (FIGS. 1 and 2) and opaque and reflective in the switched state (FIGS. 2 and 4).

The cells which have just been described are all transparent in the non switched state and prove particularly advantageous when they are applied to a timepiece 1. Indeed, lower display device 26, i.e. hands 12, 14 and 16 and dial 18, can be permanently visible with a minimal consumption of power, to the extent that only lower display device 26 needs to be supplied, upper display device 24 being supplied only when the user wishes to read an item of data provided by said display device 24.

For a complete description of the structure and operation of a cell of the PSCT type, reference will be made for example to U.S. Pat. No. 5,437,811, whose content is cited here by way of reference.

The display assembly according to the invention thus allows different display configurations to be obtained as a function of the switching state of cell 28.

The switching of cell 28 can be achieved in a conventional manner for example via switches controlled by one or more push buttons (not shown in the drawings), each actuation of a push button causing the switching of the cell which is associated therewith from one state to another.

What is claimed is:
1. A display assembly, including:
   an upper and a lower display device, the upper display device being superposed over the lower display device and including a display cell that is transparent in a first state to make the lower display device visible, said display cell displaying an item of data in a second state;
   control means for supplying a control voltage to the cell to cause it to switch from the first state to the second state and vice versa;
   wherein said display cell is a liquid crystal cell that is diffusing or reflective in the second state; and
   wherein said display cells is a liquid crystal cell selected from the group consisting of (1) twisted nematic liquid crystal cells having a linear polarizer in front of the liquid crystal cell and a quarter-wave plate and a cholesteric film placed in succession behind the cell, and (2) twisted nematic liquid crystal cells having a first polarizer placed in front of the cell, and a reflective polarizer placed behind the cell.
2. A display assembly according to claim 1, wherein said display cell comprises a twisted nematic liquid crystal cell having a linear polarizer in front of the liquid crystal cell and a quarter-wave plate and a cholesteric film having a first helical direction placed in succession behind the liquid crystal cell, and wherein the lower display device includes a cholesteric mirror having an opposite helical direction to that of said cholesteric film.
3. A display assembly according to claim 1, wherein said display cell comprises a twisted nematic liquid crystal cell having a linear polarizer in front of the liquid crystal cell and a quarter-wave plate and a cholesteric film placed in succession behind the liquid crystal cell and wherein the lower display device further includes a half-wave plate and a second cholesteric film, said cholesteric film and said second cholesteric film being identical.
4. A display assembly according to claim 1, wherein said display cell comprises a twisted nematic liquid crystal cell having a linear polarizer in front of the liquid crystal cell and a quarter-wave plate associated with a cholesteric film placed in succession behind the liquid crystal cell, and wherein the cholesteric film is chosen to reflect a wavelength or a portion of the visible spectrum corresponding to a predetermined color.

5. A display assembly according to claim 1, wherein said display cell is a twisted nematic liquid crystal cell having a first linear polarizer placed in front thereof and a reflective polarizer which may or may not be associated with a second polarizer placed behind the liquid crystal cell.

6. A display assembly according to claim 5, wherein the liquid crystal cell is a positive anisotropy twisted nematic liquid crystal cell having a linear polarizer in front thereof, and a reflective polarizer placed behind the liquid crystal cell, the polarizer and the reflective polarizer being oriented so that their axes of polarization are crossed.

7. A display assembly according to claim 6, wherein the addressing of the display cell is normal.

8. A display assembly according to claim 6, wherein the addressing of the display cell is reversed.

9. A display assembly according to claim 5, wherein the liquid crystal cell is a positive anisotropy twisted nematic liquid crystal cell having a linear polarizer placed in front thereof, and a reflective polarizer placed behind the liquid crystal cell, the polarizer and the reflective polarizer being oriented so that their axes of polarization are parallel.

10. A display assembly according to claim 9, wherein the addressing of the display cell is normal.

11. A display assembly according to claim 9, wherein the addressing of the display cell is reversed.

12. A display assembly according to claim 1, wherein the display cell is transparent in the absence of any voltage applied by the control means.

13. A display assembly according to claim 1, wherein the lower display device is a display device chosen from among the group consisting of analogue and digital devices, a combination of the latter and/or a decorative element.

14. A display assembly according to claim 1, wherein the reflective polarizer is associated with a second polarizer.

15. A timepiece including a case closed by a crystal and a back cover, and a clockwork movement housed in the case, said movement being associated With a display device of time related information, wherein said timepiece includes a display assembly including:
 an upper and a lower display device, the upper display device being superposed over the lower display device and including a display cell that is transparent in a first state to make the lower display device visible, said display cell displaying an item of data in a second state;
 control means for supplying a control voltage to the cell to cause it to switch from the first state to the second state and vice versa;
 wherein said display cell is a liquid crystal cell of the diffusing or reflective type in the second state; and
 wherein said display cell is a liquid crystal cell selected from the group consisting of (1) twisted nematic liquid crystal cells having a linear polarizer in front of the liquid crystal cell and a quarter-wave plate and a cholesteric film placed in succession behind the cell, and (2) twisted nematic liquid crystal cells having a first polarizer placed in front of the cell, and a reflective polarizer placed behind the cell, said timepiece lower display device being comprised of said display device of time related information and said upper display device extending between the crystal and said display device of time related information.

16. A timepiece according to claim 15, wherein said display device of time related information includes a dial and an hour hand and a minute hand which move above said dial.

17. A timepiece according to claim 16, wherein the crystal is formed by the upper display device.

18. A timepiece according to claim 15, wherein the crystal is formed by the upper display device.

19. A timepiece according to claim 15, wherein the reflective polarizer is associated with a second polarizer.

20. A display assembly including two superposed, respectively upper and lower display devices, the upper display device including a display cell arranged so as to be transparent in a first state to make the lower display device visible, and so as to display an item of data in a second state, control means being provided for supplying a control voltage to the display cell to cause it to switch from the first state to the second state and vice versa, wherein said display cell is a liquid crystal cell of the diffusing or reflective type in the second state, and wherein the display cell comprises a twisted nematic liquid crystal cell with a linear polarizer in front of the liquid crystal cell and a quarter-wave plate and a cholesteric film placed in succession behind the liquid crystal cell.

21. A display assembly including two superposed, respectively upper and lower display devices, the upper display device including a display cell arranged so as to be transparent in a first state to make the lower display device visible, and so as to display an item of data in a second state, control means being provided for supplying a control voltage to the display cell to cause it to switch from the first state to the second state and vice versa, wherein said display cell is a liquid crystal cell of the diffusing or reflective type in the second state, and wherein the display cell is a twisted nematic liquid crystal cell with a first polarizer placed in front of the liquid crystal cell, and a reflective polarizer placed behind the liquid crystal cell.

22. A display assembly as claimed in claim 21, wherein the reflective polarizer is associated with a second polarizer.

23. A display assembly comprising:
 an upper display device;
 a lower display device, wherein the upper display device is superposed over the lower display device and includes a display cell that is transparent in a first state so that the lower display device visible, and the display cell displays an item of data in a second state; and
 control means for supplying a control voltage to the display cell that switches the display cell from the first state to the second state and vice versa, wherein the display cell is a liquid crystal cell that is diffusing or reflective in the second state, and wherein the display cell comprises a twisted nematic liquid crystal cell having a linear polarizer in front of the liquid crystal cell and a quarter-wave plate and a cholesteric film placed in succession behind the liquid crystal cell, and wherein one of the upper and lower display devices further includes a second quarter-wave plate, and wherein the lower display device includes a metal reflector placed behind the second quarter-wave plate.

* * * * *